(12) United States Patent
Bialer et al.

(10) Patent No.: US 10,187,134 B1
(45) Date of Patent: Jan. 22, 2019

(54) $T_x$ BEAMFORMER IN MIMO RADAR

(71) Applicants: GM GLOBAL TECHNOLOGY OPERATIONS LLC, Detroit, MI (US); SILANTRIX LTD., Kfar Saba (IL)

(72) Inventors: Oded Bialer, Petah Tivak (IL); Igal Bilik, Rehovot (IL); Dani Raphaeli, Kfar Saba (IL)

(73) Assignees: GM GLOBAL TECHNOLOGY OPERATIONS LLC, Detroit, MI (US); SILANTRIX LTD., Kfar Saba (IL)

( * ) Notice: Subject to any disclaimer, the term of this patent is extended or adjusted under 35 U.S.C. 154(b) by 0 days.

(21) Appl. No.: 15/828,857

(22) Filed: Dec. 1, 2017

(51) Int. Cl.
| | | |
|---|---|---|
| *H04B 7/06* | (2006.01) | |
| *H04B 7/024* | (2017.01) | |
| *G01S 13/87* | (2006.01) | |
| *G01S 7/03* | (2006.01) | |
| *G01S 7/34* | (2006.01) | |
| *G01S 7/40* | (2006.01) | |
| *H04B 7/0426* | (2017.01) | |

(52) U.S. Cl.
CPC ............ *H04B 7/0617* (2013.01); *G01S 7/038* (2013.01); *G01S 7/34* (2013.01); *G01S 7/4021* (2013.01); *G01S 13/878* (2013.01); *H04B 7/024* (2013.01); *H04B 7/043* (2013.01); *H04B 7/0634* (2013.01)

(58) Field of Classification Search
CPC .. H04B 7/0452; H04B 7/0617; H04B 7/0634; H04B 7/0413; H04B 7/0456; H04B 7/0478; H04B 7/043; H04B 7/0482; H04L 2025/03426; H04L 25/03343
USPC .......................................................... 375/267
See application file for complete search history.

(56) References Cited

U.S. PATENT DOCUMENTS

| | | | |
|---|---|---|---|
| 9,118,372 B2* | 8/2015 | Maltsev ............... | H04B 7/0404 |
| 2015/0215009 A1* | 7/2015 | Jia ........................ | H04B 7/0452 |
| | | | 375/267 |

* cited by examiner

*Primary Examiner* — Leila Malek
(74) *Attorney, Agent, or Firm* — Reising Ethington, P.C.

(57) ABSTRACT

A method for transmit beamforming in a MIMO antenna for a radar system having N transmit antennas includes acquiring a coding matrix defining a desired field-of-view, generating a transmit signal matrix based on a singular value decomposition (SVD) of the coding matrix, wherein the columns of the transmit signal matrix are transmit signal vectors formed from the singular vectors corresponding to the maximal singular values of the coding matrix based on the SVD, the transmit signal vectors defining spatial codewords, and transmitting signals in sequences over the N transmit antennas according to the transmit signal matrix, the sequences correspond to the spatial codewords from the transmit signal vectors, wherein each sequence is defined by a number of spatial codewords transmitted in a single repetition sequence interval, and wherein transmitting the spatial codewords according to the transmit signal matrix enables beamforming of the transmitted signals to the desired field-of-view.

20 Claims, 2 Drawing Sheets

$T_x$ BEAMFORMER IN MIMO RADAR

INTRODUCTION

The present invention relates generally to radar systems, and more particularly, to a multiple-input multiple-output (MIMO) radar and a method for implementing a coding scheme that enables transmit beamforming.

Advanced radar systems in use today use a multiple-input multiple-output (MIMO) concept that employs multiple antennas at the transmitter to transmit independent (orthogonal) waveforms and multiple antennas at the receiver to receive the radar echoes. In a "collocated" MIMO radar configuration, the antennas in both the transmitter and the receiver are spaced sufficiently close so that each antenna views the same aspect of an object such that a point target is assumed. In the MIMO receiver, a matched filter bank is used to extract the orthogonal waveform components. When the orthogonal signals are transmitted from different antennas, the echoes of each signal carry independent information about detected objects and the different propagation paths. Phase differences caused by different transmitting antennas along with phase differences caused by different receiving antennas mathematically form a virtual antenna array that provides for a larger virtual aperture using fewer antenna elements. Conceptually, the virtual array is created by an interleaving between each of the transmitter $T_x$ and receiver $R_x$ antenna elements such that the elements in the virtual array represent $T_x$-$R_x$ pairs for each of the transmitter $T_x$ and receiver $R_x$ antennas in the MIMO array. For collocated MIMO antennas, a transmit array having N transmitter antennas and a receive array having M receiver antennas produces a virtual array having M×N virtual receiver elements. In other words, the orthogonal waveforms are extracted by the matched filters at the receiver such that there are a total of M×N extracted signals in the virtual array.

In addition to generating and transmitting individual orthogonal waveforms from each transmitter antenna, the transmitted signals may be orthogonalized using various coding techniques. For example, each transmitter antenna may be configured to transmit a waveform with a different code. Thus, a transmit array will transmit N orthogonal spatial codewords that span the entire radar field-of-view, which generally ranges from 120° (+/−60° from boresight) to 180° (+/−90° boresight). The codewords are transmitted over each of the N transmit antennas as a sequence of symbols. Because the received signal vector is a sum of the echo signals transmitted from all of the N transmit antennas, to achieve separation of the N transmission channels at the receiver, the number of symbols in a sequence (i.e., the number of transmitted codewords) must be equal to the number of transmit antennas, N. Consequently, as the number of transmit antennas increases, so does the length of the codewords and the repetition interval of each sequence. However, as the repetition interval increases, ambiguity arises with respect to velocity estimation (i.e., Doppler frequency).

SUMMARY

According to an embodiment of the invention, there is provided a method for transmit beamforming in a multiple input multiple output (MIMO) antenna for a radar system having N transmit antennas. The method includes acquiring a coding matrix defining a desired field-of-view, generating a transmit signal matrix based on a singular value decomposition (SVD) of the coding matrix, wherein the columns of the transmit signal matrix are transmit signal vectors formed from the singular vectors corresponding to the maximal singular values of the coding matrix based on the SVD, the transmit signal vectors defining spatial codewords, and transmitting signals in sequences over the N transmit antennas according to the transmit signal matrix, the sequences correspond to the spatial codewords from the transmit signal vectors, wherein each sequence is defined by a number of spatial codewords transmitted in a single repetition sequence interval, and wherein transmitting the spatial codewords according to the transmit signal matrix enables beamforming of the transmitted signals to the desired field-of-view. The transmission of the spatial codewords spans the desired field-of-view In one example, the number of columns in the transmit signal matrix is less than the N transmit antennas, wherein the number of columns in the transmit signal matrix corresponds to the number of spatial codewords transmitted in the single repetition sequence interval.

In another example, the number of spatial codewords transmitted in a single repetition sequence interval is less than the N transmit antennas, wherein each spatial codeword in the transmit signal vectors has N symbols, and wherein the sequence of codewords transmitted over the N antennas are orthogonal enabling separation of the transmit channels in the desired field-of-view.

In another example, the transmit signal vectors are eigenvectors corresponding to the maximum eigen values of the coding matrix enabling maximal energy from the transmitted signals to be directed to the desired field-of-view, wherein the transmit signal vectors have a dimension of N×1.

In another example, the coding matrix includes a diagonal masking matrix configured to mask an angular field-of-view of the radar to exclude spatial regions outside of the desired field-of-view, and wherein the diagonal masking matrix is an N×N matrix with diagonal elements corresponding to N equally spaced regions in the radar field-of-view, wherein diagonal elements having a value of 1 indicate spatial regions in the desired field-of-view and diagonal elements having a value of 0 indicate spatial regions outside of the desired field-of-view.

In another example, the SVD of the coding matrix is the product of an orthogonal matrix, a diagonal matrix, and a transpose matrix of the orthogonal matrix, wherein the orthogonal matrix is an N×N matrix with columns that represent left singular vectors of the coding matrix, and diagonal elements in the diagonal matrix represent the singular values of the coding matrix, wherein the columns of the transmit signal matrix formed from singular vectors of the coding matrix are the singular vectors in the orthogonal matrix that correspond to maximal singular values in the diagonal matrix.

According to another embodiment of the invention, there is provided a method for transmit beamforming in a multiple input multiple output (MIMO) antenna for a radar system having N transmit antennas. The method includes calculating a coding matrix as a function of a desired field-of-view, decomposing the coding matrix to determine the eigenvectors of the coding matrix that correspond to the maximum eigen values of the coding matrix, generating a transmit signal matrix based on the decomposition of the coding matrix, the transmit signal matrix having a dimension of N×Q, wherein the Q columns of the transmit signal matrix are the eigenvectors of the coding matrix, and wherein each column defines a spatial codeword having N symbols, transmitting signals in sequences over the N transmit antennas according to the transmit signal matrix, the sequences correspond to the spatial codewords from the columns of the transmit signal matrix, wherein Q spatial codewords are transmitted for each sequence, and wherein transmitting the Q spatial codewords according to the transmit signal matrix enables beamforming of the transmitted signals to the desired field-of-view.

According to yet another embodiment of the invention, there is provided a multiple input multiple output (MIMO) antenna for a radar system. The antenna includes an antenna array having N transmit antennas and a transmitter configured to acquire a coding matrix defining a desired field-of-view, generate a transmit signal matrix based on a singular value decomposition (SVD) of the coding matrix, wherein the columns of the transmit signal matrix are transmit signal vectors formed from the singular vectors corresponding to the maximal singular values of the coding matrix based on the SVD, the transmit signal vectors defining spatial codewords, and transmit signals over the N transmit antennas according to the transmit signal matrix, wherein the signals represent sequences of the spatial codewords from the transmit signal vectors, wherein each sequence corresponds to a number of spatial codewords transmitted in a single repetition sequence interval, and wherein transmitting the spatial codewords according to the transmit signal matrix achieves beamforming of the transmit signals to the desired field-of-view.

In one example, the number of spatial codewords transmitted in a single repetition sequence interval is less than the N transmit antennas, and wherein the coding matrix includes a diagonal masking matrix configured to mask an angular field-of-view of the radar to exclude spatial regions outside of the desired field-of-view.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

As required, detailed embodiments are disclosed herein. However, it is understood that the disclosed embodiments are merely exemplary of various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, components, systems, materials, or methods that are well-known to those having ordinary skill in the art have not been described in detail to avoid obscuring the present disclosure. Therefore, specific structural and functional details disclosed herein are not to be interpreted as limiting, but merely as a basis for the claims and as a representative basis for teaching one skilled in the art. Moreover, while the approach and methodology may in some instances be described below with respect to vehicles, one of ordinary skill in the art appreciates that an automotive application is merely exemplary, and that the concepts disclosed herein may also be applied to any other suitable radar detection systems such as, for example, air traffic control, nautical navigation, and weapons guidance systems, to name a few. The term vehicle as described herein is also to be construed broadly to include not only a passenger car, but any other vehicle including, but not limited to, motorcycles, trucks, sports utility vehicles (SUVs), recreational vehicles (RVs), marine vessels, and aircraft.

Figure 1:
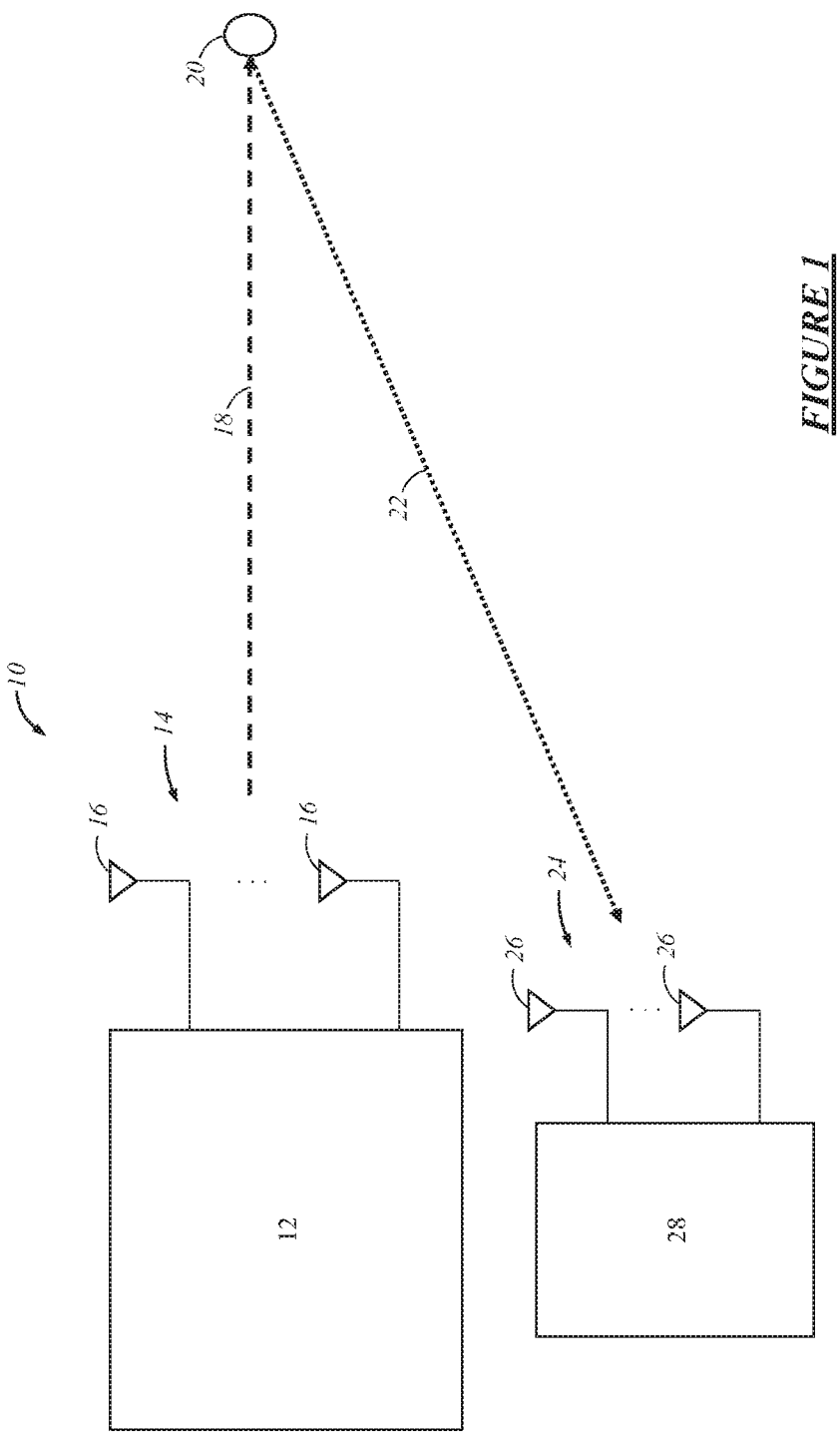
FIG. 1 illustrates an exemplary architecture of a MIMO radar system according to an embodiment of the present disclosure.

The system and method described below are directed to a multiple-input multiple-output (MIMO) radar and a method for implementing a coding scheme that enables transmit beamforming. FIG. 1 illustrates an exemplary architecture for a MIMO radar 10 that can be used to implement the disclosed method. While the approach and methodology described herein relate to the radar configuration shown in FIG. 1, one of ordinary skill in the art appreciates that radar 10 is merely exemplary, and in many ways, has been simplified for ease of explanation. One further appreciates that the transmitter, receiver, and antenna arrays shown in FIG. 1 are overly simplified for ease of explanation.

The MIMO radar 10 includes a transmitter 12 communicatively coupled to a transmit array 14 having N transmit antenna elements 16 configured to create a sensor field-of-view that monitors a particular zone of interest. The transmit array 14 is configured to transmit electromagnetic signals 18 that reflect off remote objects or targets 20 within the radar sensor's field-of-view. In one embodiment, the MIMO radar 10 is configured to transmit and detect radar signals in a direction normal to the view of the MIMO antenna array. That is, the bore-site of each MIMO antenna is generally normal to a surface of the antenna array.

The transmitter 12 may be a unitary module or may include a plurality of other modules, or sub-modules, configured to generate electromagnetic signals for transmission over the transmit antennas 16 in accordance with the method and algorithms disclosed herein. In one embodiment, the transmitter 12 includes, without limitation, waveform generators, oscillators, amplifiers, mixers, combiners, filters, converters, and processors. By way of example only, the waveform generator may be configured to generate pulses having a different pulse width, different waveform type, and different pulse repetition intervals (PRI) within a given coherent processing interval (CPI). The pulses may then be digitized by a digital to analog (D/A) converter and up converted to a radio frequency carrier using an up converter. The up converter consists of intermediate frequency (IF) and or radio frequency (RF) oscillators, filters and synchronizing circuits. A transmit amplifier generates a transmit signal, which is fed to a circulator coupled to one or more of the transmit antennas 16.

Return signals 22 reflected from the objects 20 are received as echoes by a receiver array 24 having M receive antenna elements 26. The return signals 22 are processed by a signal processing module 28 configured to extract information from the echoes relating to the detected targets such as, for example, range, azimuth angle, and range rate data including Doppler measurements. The signal processing module 28 may be a unitary module or may include a plurality of other modules, or sub-modules, configured to receive and process the radar echo signals. In one embodiment, the signal processing module 28 includes, without limitation, amplifiers, mixers, oscillators, combiners, filters, and converters. The functions performed by signal processing module 28 may vary, but generally include performing various filtering, amplification, conversion and digitizing functions, as well as analyzing various properties of the signal to determine characteristics of the signal such as phase, frequency, and amplitude. As understood by those skilled in the art, the techniques used to extract this information from the signals may vary, but may include without limitation, in-phase and quadrature analysis and frequency domain analysis using Fourier transform. In one embodiment, the signal processing module 28 may also include, without limitation, components to perform pulse compression and clutter rejection (e.g., Doppler filtering) functions.

In one particular embodiment, the MIMO radar 10 may implemented on a vehicle, wherein the transmitter 12 and the signal processing module 28 may be implemented as a vehicle control module. The control module may include any variety of electronic processing devices, memory devices, input/output (I/O) devices, and/or other known components, and may perform various control and/or communication related functions. Depending on the particular embodiment, control module may be a stand-alone vehicle electronic module, it may be incorporated or included within another vehicle electronic module (e.g., a park assist control module, brake control module, etc.), or it may be part of a larger network or system (e.g., collision control module (CCM), a traction control system (TCS), electronic stability control (ESC) system, antilock brake system (ABS), driver assistance system, adaptive cruise control system, lane departure warning system, etc.), to name a few possibilities. Control module is not limited to any one particular embodiment or arrangement.

Figure 2:
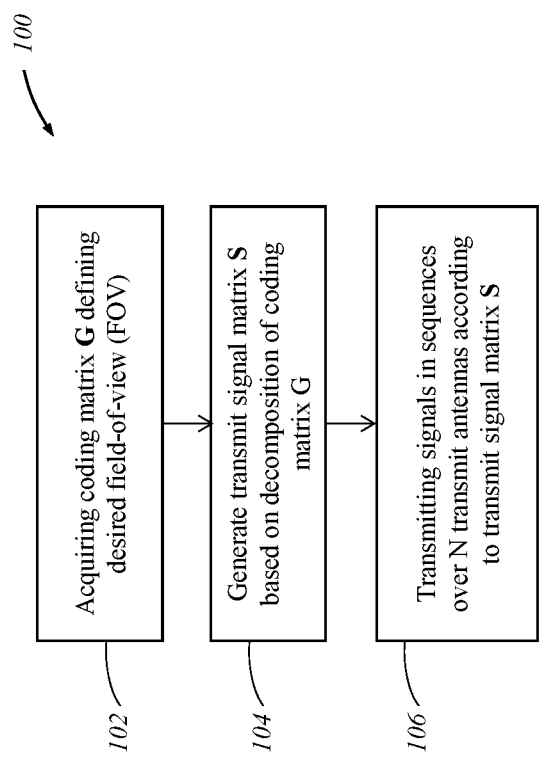
FIG. 2 illustrates a flow chart depicting an exemplary method for implementing the disclosed coding scheme according to an embodiment of the present disclosure.

FIG. 2 illustrates a flow chart depicting an exemplary method 100 for implementing a coding scheme that enables transmit beamforming using the MIMO radar 10 described above with respect to FIG. 1. It should be understood that the steps of the method 100 are not necessarily presented in any particular order and that performance of some or all the steps in an alternative order is possible and is contemplated. The method 100 begins at step 102 by acquiring a coding matrix G defining a desired field-of-view (FOV). When implemented on a vehicle, disclosed MIMO radar may be a long-range radar, wherein the desired FOV is relatively narrow, which in one non-limiting example may be less than 30° (+/−15°). The coding matrix G is a function of the desired FOV and may be pre-configured or generated during operation of the radar 10. In any case, the coding matrix is known to the transmitter 14.

In one embodiment, the coding matrix $G=F^H \Lambda F$, where F is a beamforming matrix of dimension N×N corresponding to N transmit antenna elements (e.g., a Bartlett beamforming matrix or discrete Fourier transform (DFT) matrix), $F^H$ is a conjugate transpose of F, and A is an N×N diagonal matrix with diagonal elements having a value of 1 or 0. The diagonal elements correspond to N equally spaced regions in the entire FOV of approximately +/−90 degrees. The diagonal elements having a value of 1 indicate the FOV of interest (i.e., the desired FOV). The diagonal elements having a value of 0 indicate a spatial region that is outside of the desired FOV. Thus, the diagonal matrix A is a diagonal masking matrix configured to mask an angular field-of-view of the radar to exclude spatial regions outside of the desired field-of-view. In another embodiment, instead of the diagonal matrix A having binary values (i.e., 0/1), the diagonal matrix A may in general have floating values that represent high values in the FOV of interest and low values (decaying values) at the region that is outside of the FOV of interest.

In one embodiment, acquiring the coding matrix G may include calculating the coding matrix as a function of the desired FOV and decomposing the coding matrix G at the transmitter 12 using known decomposition techniques such as, for example, eigenvalue or singular value decomposition (SVD). Using the SVD technique, decomposition of $G=U\Gamma U^H$, where U is a N×N matrix with columns that are the left singular vectors of G, $U^H$ is a conjugate transpose of U and Γ is a diagonal matrix with singular values of G. The SVD decomposition of the coding matrix G produces a set of eigenvectors of G, from which a smaller subset is chosen, such that the smaller subset corresponds to the maximal eigenvalues of G.

At step 104, the transmitter 12 generates a transmit signal matrix S based on the decomposition of coding matrix G in step 102. In one embodiment, the transmit signal matrix $S=[S_0, S_i, \ldots S_Q]$ having a dimension of N×Q, where Q is the number of transmitted codewords transmitted over the N transmit antennas in a single repetition interval, $S_i$ is a transmit signal vector of dimension N×1 representing a spatial codeword transmitted at symbol time index i, wherein i=0–Q. The columns of the transmit signal matrix S are set as the Q singular vectors corresponding to the Q maximal singular values of the coding matrix G from step 102, and more specifically, to the Q singular vectors in U that correspond to the Q maximal singular values in Γ. Stated differently, the columns of the transmit signal matrix S are the eigenvectors corresponding to the maximum eigen values of the coding matrix G. Using the maximum eigenvectors that correspond to the maximal eigenvalues enables maximal energy from the transmitted signals to be directed to the desired FOV. The transmit signal matrix S is configured such that Q is less than N transmit antennas. In other words, the repetition sequence interval of the spatial codewords is less than the number of N transmit antennas, wherein each spatial codeword in the transmit signal vectors has N symbols. In this way, the temporal sequence of each N transmit antenna is shorter (i.e., the number of spatial codewords in a period is shorter), which results in less ambiguity in the target Doppler frequency estimation. The Doppler frequency ambiguity is proportional to the code sequence period. As the sequence is shorter, there is less ambiguity in the Doppler estimation At step 106, signals are transmitted in sequences over the N transmit antennas according to the transmit signal matrix S, wherein the sequences correspond to the spatial codewords from the transmit signal vectors (i.e., the column vectors of S), wherein each sequence is defined by the number of spatial codewords transmitted in a single repetition sequence interval, and wherein transmitting the spatial codewords according to the transmit signal matrix S enables beamforming of the transmitted signals to the desired FOV. The sequence of codewords transmitted over the N antennas are orthogonal enabling separation of the transmit channels in the desired field-of-view.

The transmitted signals sent according to the transmit signal matrix S are received as echoes by the receiver array 24 and processed by the signal processing module 28. The noiseless received signal vector $Y=H_\theta GS$ is an M×Q matrix, where $H_\theta$ is a channel coefficient matrix of dimension M×N representing all of the channel coefficients (i.e., channel response) between the transmit and receive antenna elements. More particularly, $H_\theta = a_{Rx}(\theta) a_{Tx}^H(\theta)$ where $a_{Tx}(\theta)$ is a vector of length N×1, which is the channel complex coefficient (i.e., channel response) between each transmit antenna element and the reflection at angle θ, wherein H represents the conjugate transpose, and $a_{Rx}(\theta)$ is a vector of length M×1, which is the channel complex coefficient (i.e., channel response) between each receive antenna element and the reflection at angle θ.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present patent application.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method for transmit beamforming in a multiple input multiple output (MIMO) antenna for a radar system having N transmit antennas, the method comprising:
   acquiring a coding matrix defining a desired field-of-view;
   generating a transmit signal matrix based on a singular value decomposition (SVD) of the coding matrix, wherein the columns of the transmit signal matrix are transmit signal vectors formed from the singular vectors corresponding to the maximal singular values of the coding matrix based on the SVD, the transmit signal vectors defining spatial codewords; and
   transmitting signals in sequences over the N transmit antennas according to the transmit signal matrix, the sequences correspond to the spatial codewords from the transmit signal vectors, wherein N is an integer greater than one, wherein each sequence is defined by a number of spatial codewords transmitted in a single repetition sequence interval, and wherein transmitting the spatial codewords according to the transmit signal matrix enables beamforming of the transmitting signals to the desired field-of-view.

2. The method of claim 1, wherein transmission of the spatial codewords spans the desired field-of-view.

3. The method of claim 1, wherein the number of columns in the transmit signal matrix is less than the N transmit antennas.

4. The method of claim 1, wherein the number of columns in the transmit signal matrix corresponds to the number of spatial codewords transmitted in the single repetition sequence interval.

5. The method of claim 1, wherein the number of spatial codewords transmitted in a single repetition sequence interval is less than the N transmit antennas.

6. The method of claim 1, wherein each spatial codeword in the transmit signal vectors has N symbols.

7. The method of claim 1, wherein the sequence of codewords transmitted over the N antennas are orthogonal enabling separation of the transmit channels in the desired field-of-view.

8. The method of claim 1, wherein the transmit signal vectors are eigenvectors corresponding to the maximum eigen values of the coding matrix enabling maximal energy from the transmitting signals to be directed to the desired field-of-view.

9. The method of claim 1, wherein the transmit signal vectors have a dimension of N×1.

10. The method of claim 1, wherein the coding matrix includes a diagonal masking matrix configured to mask an angular field-of-view of the radar to exclude spatial regions outside of the desired field-of-view.

11. The method of claim 10, wherein the diagonal masking matrix is an N×N matrix with diagonal elements corresponding to N equally spaced regions in the radar field-of-view, wherein diagonal elements having a value of 1 indicate spatial regions in the desired field-of-view and diagonal elements having a value of 0 indicate spatial regions outside of the desired field-of-view.

12. The method of claim 1, wherein the SVD of the coding matrix is the product of an orthogonal matrix, a diagonal matrix, and a transpose matrix of the orthogonal matrix, wherein the orthogonal matrix is an N×N matrix with columns that represent left singular vectors of the coding matrix, and diagonal elements in the diagonal matrix represent the singular values of the coding matrix.

13. The method of claim 12, wherein the columns of the transmit signal matrix formed from singular vectors of the coding matrix are the singular vectors in the orthogonal matrix that correspond to maximal singular values in the diagonal matrix.

14. A method for transmit beamforming in a multiple input multiple output (MIMO) antenna for a radar system having N transmit antennas, the method comprising:
   calculating a coding matrix as a function of a desired field-of-view;
   decomposing the coding matrix to determine the eigenvectors of the coding matrix that correspond to the maximum eigen values of the coding matrix;
   generating a transmit signal matrix based on the decomposition of the coding matrix, the transmit signal matrix having a dimension of N×Q, wherein N is an integer greater than one, wherein Q is an integer greater than zero, wherein the Q columns of the transmit signal matrix are the eigenvectors of the coding matrix, and wherein each column defines a spatial codeword having N symbols; and transmitting signals in sequences over the N transmit antennas according to the transmit signal matrix, the sequences correspond to the spatial codewords from the columns of the transmit signal matrix, wherein Q spatial codewords are transmitted for each sequence, and wherein transmitting the Q spatial codewords according to the transmit signal matrix enables beamforming of the transmitting signals to the desired field-of-view.

15. The method of claim 14, wherein the eigenvectors of the coding matrix correspond to the maximum eigen values of the coding matrix enabling maximal energy from the transmitting signals to be directed to the desired field-of-view.

16. The method of claim 14, wherein the Q spatial codewords in each sequence are less than the N transmit antennas.

17. The method of claim 14, wherein the coding matrix includes a diagonal masking matrix configured to mask an angular field-of-view of the radar to exclude spatial regions outside of the desired field-of-view.

18. A multiple input multiple output (MIMO) antenna for a radar system, the antenna comprising:

an antenna array having N transmit antennas, wherein N is an integer greater than one; and a transmitter configured to:

acquire a coding matrix defining a desired field-of-view;

generate a transmit signal matrix based on a singular value decomposition (SVD) of the coding matrix, wherein the columns of the transmit signal matrix are transmit signal vectors formed from the singular vectors corresponding to the maximal singular values of the coding matrix based on the SVD, the transmit signal vectors defining spatial codewords; and transmit signals over the N transmit antennas according to the transmit signal matrix, wherein the signals represent sequences of the spatial codewords from the transmit signal vectors, wherein each sequence corresponds to a number of spatial codewords transmitted in a single repetition sequence interval, and wherein transmitting the spatial codewords according to the transmit signal matrix achieves beamforming of the transmit signals to the desired field-of-view.

19. The MIMO antenna of claim 18, wherein the number of spatial codewords transmitted in a single repetition sequence interval is less than the N transmit antennas.

20. The MIMO antenna of claim 18, wherein the coding matrix includes a diagonal masking matrix configured to mask an angular field-of-view of the radar to exclude spatial regions outside of the desired field-of-view.

* * * * *